(12) United States Patent
Lin (10) Patent No.: US 12,472,567 B1
(45) Date of Patent: Nov. 18, 2025

(54) TOOL CONNECTOR

(71) Applicant: Hung-Wen Lin, Taichung (TW)

(72) Inventor: Hung-Wen Lin, Taichung (TW)

( * ) Notice: Subject to any disclaimer, the term of this patent is extended or adjusted under 35 U.S.C. 154(b) by 0 days.

(21) Appl. No.: 19/206,565

(22) Filed: May 13, 2025

(51) Int. Cl.
  *B23B 51/04* (2006.01)
  *B23B 31/00* (2006.01)
  *B23B 31/107* (2006.01)

(52) U.S. Cl.
  CPC ........ *B23B 51/0473* (2013.01); *B23B 31/003* (2013.01); *B23B 31/1071* (2013.01); *B23B 31/1075* (2013.01); *Y10T 279/17752* (2015.01); *Y10T 279/17811* (2015.01); *Y10T 279/3481* (2015.01)

(58) Field of Classification Search
  CPC .............. B23B 31/003; B23B 31/1071; B23B 51/0473; Y10T 279/17752; Y10T 279/17811; Y10T 279/3481; Y10T 408/895; Y10T 408/8953; Y10T 408/8957; Y10T 408/896
  USPC ..... 408/204, 205, 206, 207; 279/75, 82, 155
  See application file for complete search history.

(56) References Cited

U.S. PATENT DOCUMENTS

| | | | | |
|---|---|---|---|---|
| 4,692,073 A | * | 9/1987 | Martindell | B25B 21/00 279/82 |
| 5,398,946 A | * | 3/1995 | Quiring | B25D 17/088 403/325 |
| 5,447,397 A | * | 9/1995 | Asano | B23B 51/0473 279/82 |
| 2002/0028117 A1 | * | 3/2002 | Nuss | B23B 31/1071 279/75 |
| 2005/0025592 A1 | * | 2/2005 | Cantlon | B23B 51/0473 408/204 |
| 2007/0160435 A1 | * | 7/2007 | Chao | B23B 31/1071 408/102 |
| 2010/0127465 A1 | * | 5/2010 | Miyanaga | B23B 31/1071 279/76 |
| 2014/0255117 A1 | * | 9/2014 | Tseng | B23B 51/0473 408/204 |

(Continued)

FOREIGN PATENT DOCUMENTS

| | | | | |
|---|---|---|---|---|
| DE | 20113578 U1 | * | 10/2001 | ......... B23B 51/0473 |
| EP | 2489488 A1 | * | 8/2012 | ........... B23B 49/005 |

(Continued)

*Primary Examiner* — Sunil K Singh
*Assistant Examiner* — Michael Vitale
(74) *Attorney, Agent, or Firm* — MUNCY, GEISSLER, OLDS & LOWE, P.C.

(57) ABSTRACT

A tool connector includes a main body, an adapter, a first engaging member and a sleeve. The main body includes a driving end portion and a connecting end portion. The main body has a first receiving hole extending along the axial direction and a second receiving hole communicated with the first receiving hole. The adapter is non-rotatably disposed within the first receiving hole and includes a through hole configured for a tool head to be disposed therethrough. The first receiving hole, the second receiving hole and the through hole respectively have a first, a second and a third cross-sectional profiles being non-circular. The second and the third cross-sectional profiles are identical in shape and coaxially arranged. As viewed in the axial direction, at least one geometric feature of the second cross-sectional profile corresponds to at least one geometric feature of the third cross-sectional profile.

9 Claims, 5 Drawing Sheets

(56) References Cited

U.S. PATENT DOCUMENTS

| | | | |
|---|---|---|---|
| 2015/0202689 A1* | 7/2015 | Chen | B23B 31/003 |
| | | | 279/30 |
| 2016/0214240 A1* | 7/2016 | Chen | B23B 31/1071 |
| 2019/0217400 A1* | 7/2019 | Ding | B23B 31/1071 |
| 2024/0278337 A1* | 8/2024 | Sanogo | B23B 51/0473 |
| 2024/0293875 A1* | 9/2024 | Rechlin | B23B 51/0473 |

FOREIGN PATENT DOCUMENTS

| | | | | |
|---|---|---|---|---|
| EP | 2502693 A1 | * | 9/2012 | B23B 51/0426 |
| TW | M294374 U | * | 7/2006 | B23B 31/1071 |

* cited by examiner

TOOL CONNECTOR

BACKGROUND OF THE INVENTION

Field of the Invention

The present invention relates to a tool connector.

Description of the Prior Art

Conventional tool connectors are typically used to connect a driving head of a driving tool to various types of tool heads, such as screwdriver bits, sockets, drill bits, and hole saws. These tool heads are often mounted to the tool connector via a quick-release mechanism, allowing for rapid replacement. In the case of tool connectors used with hole saws, they generally include a main body, an adapter inserted into the main body, and a quick-release mechanism disposed on the main body to engage the adapter. The adapter simultaneously connects both a centrally located drill bit and a cylindrical hole saw surrounding the drill bit. When the quick-release mechanism is actuated to release the adapter, the drill bit and the hole saw are detached together.

However, while most existing tool connectors offer a quick-change feature, they do not allow independent replacement of the hole saw and instead require removing both the drill bit and the hole saw together, limiting operational flexibility. Furthermore, because the drill bit is connected to the adapter rather than being directly mounted to the main body, the overall assembly tends to be less stable, thereby reducing torque transmission efficiency during operation. Moreover, to enhance assembly convenience and expand compatibility, the adapter's receiving cavity for connecting to the drill bit is often designed as a circular hole, which further weakens the effectiveness of torque transmission.

The present invention is, therefore, arisen to obviate or at least mitigate the above-mentioned disadvantages.

SUMMARY OF THE INVENTION

The main object of the present invention is to provide a tool connector, which provides good assembly stability and good torque transmission performance.

To achieve the above and other objects, the present invention provides a tool connector, including: a main body, an adapter, a first engaging member and a sleeve. The main body includes a driving end portion and a connecting end portion opposite to each other in an axial direction, and the driving end portion is configured to be connected with a driving tool. The main body has a first receiving hole extending along the axial direction from the connecting end portion toward the driving end portion and a second receiving hole communicated with the first receiving hole, and a diametrical dimension of the first receiving hole is larger than a diametrical dimension of the second receiving hole. A side of the main body close to the connecting end portion has a first radial hole extending in a direction lateral to the axial direction and communicated with the first receiving hole. The adapter is non-rotatably disposed within the first receiving hole and includes a through hole configured for a tool head to be disposed therethrough. The first engaging member is movably received within the first radial hole. The sleeve is sleeved to the main body and is movable between a lock position and a release position. When the sleeve is in the lock position, the sleeve urges the first engaging member to radially protrude into the first receiving hole and be engaged with the adapter in the axial direction. When the sleeve is in the release position, the first engaging member is radially retractable and the adapter is detachable from the first receiving hole. The first receiving hole has a first cross-sectional profile being non-circular, the second receiving hole has a second cross-sectional profile being non-circular, and the through hole has a third cross-sectional profile being non-circular. The second cross-sectional profile and the third cross-sectional profile are identical in shape and are coaxially arranged. As viewed in the axial direction, at least one geometric feature of the second cross-sectional profile corresponds to at least one geometric feature of the third cross-sectional profile.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
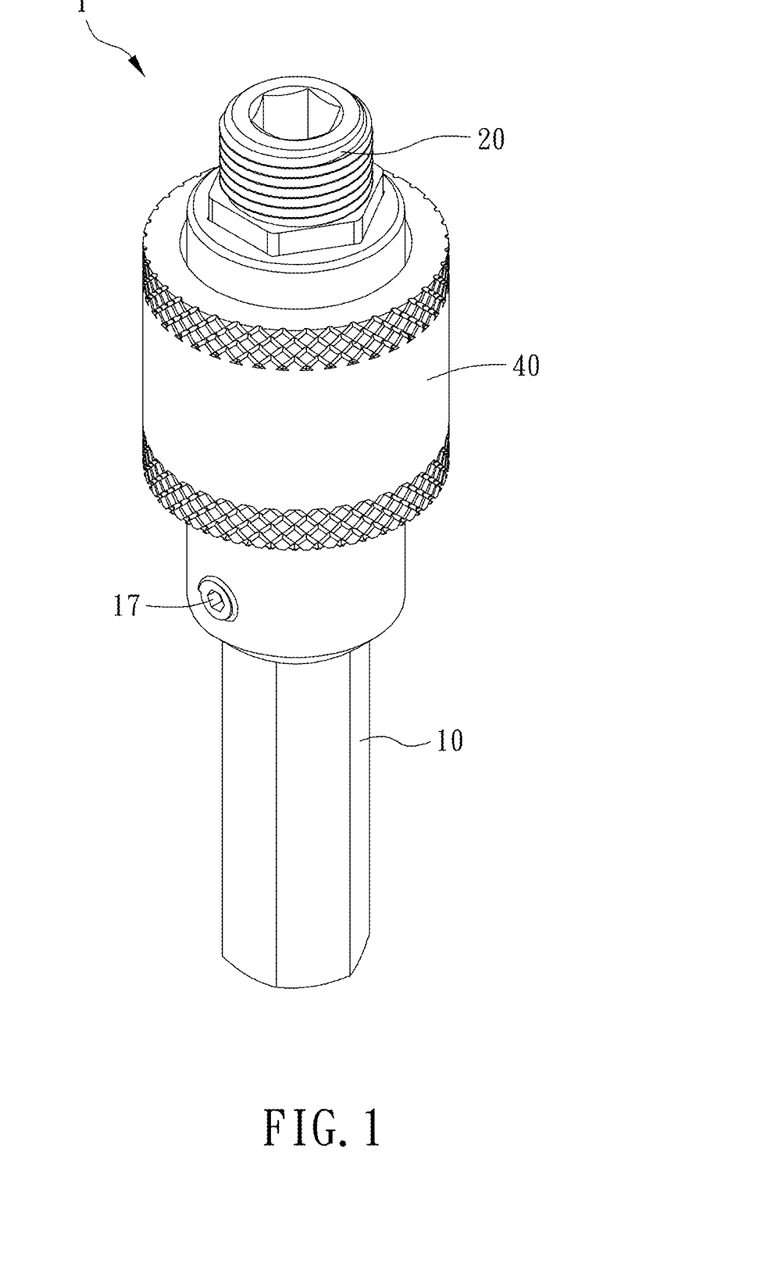
FIG. 1 is a stereogram of a preferable embodiment of the present invention.
Figure 2:
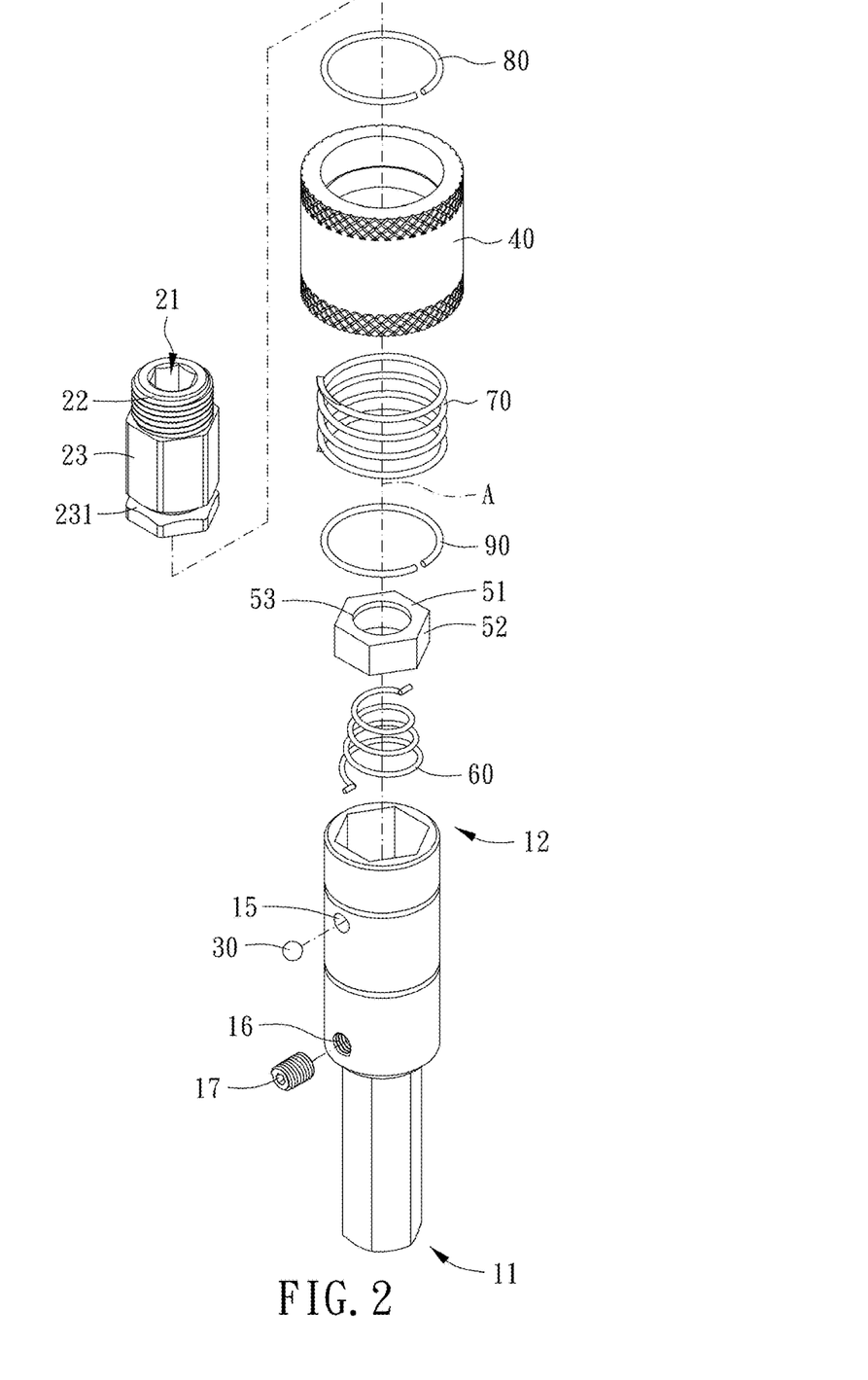
FIG. 2 is a breakdown drawing of a preferable embodiment of the present invention.
Figure 3:
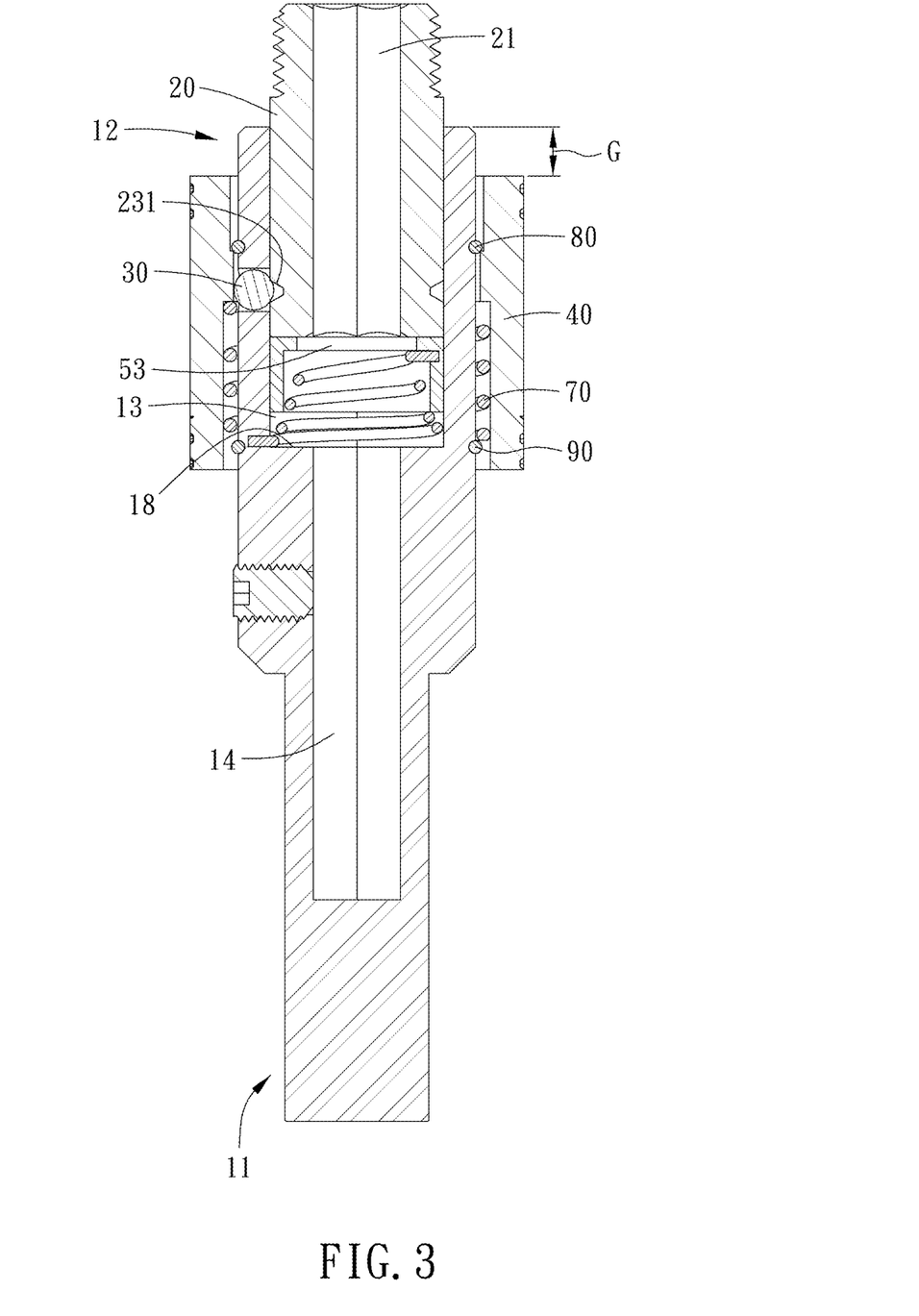
FIG. 3 is a cross-sectional view of a preferable embodiment of the present invention.
Figure 4:
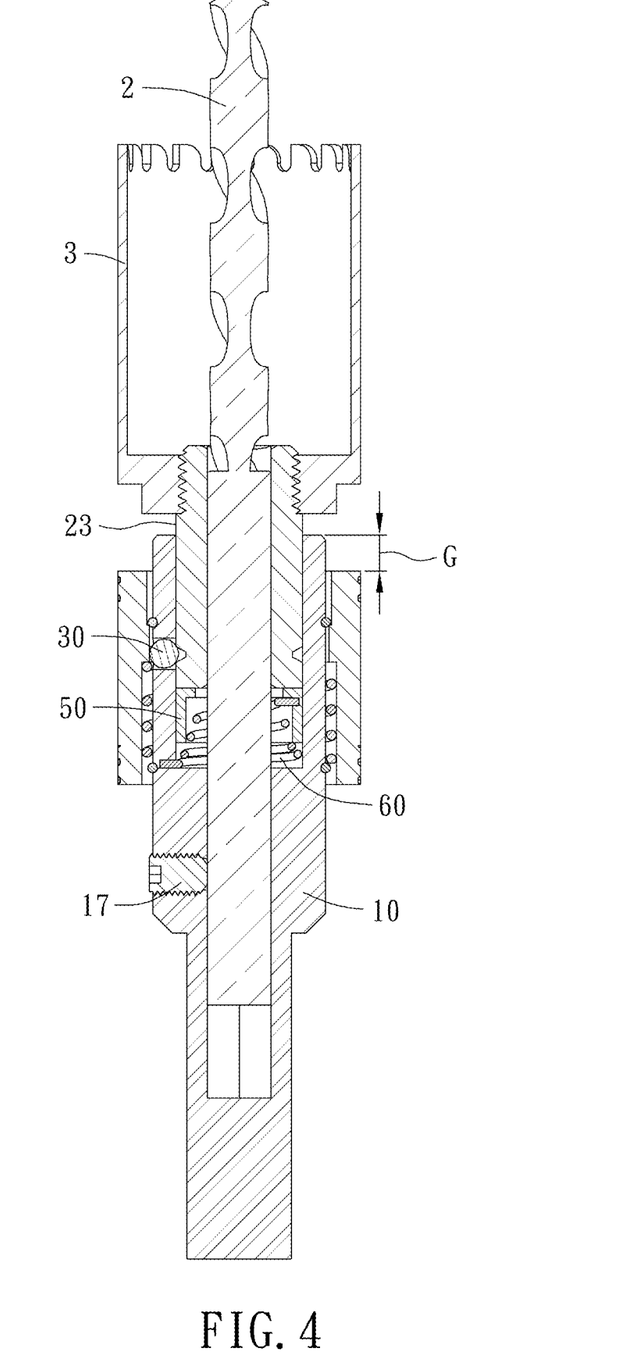
FIG. 4 is a cross-sectional view of a preferable embodiment of the present invention in use.
Figure 5:
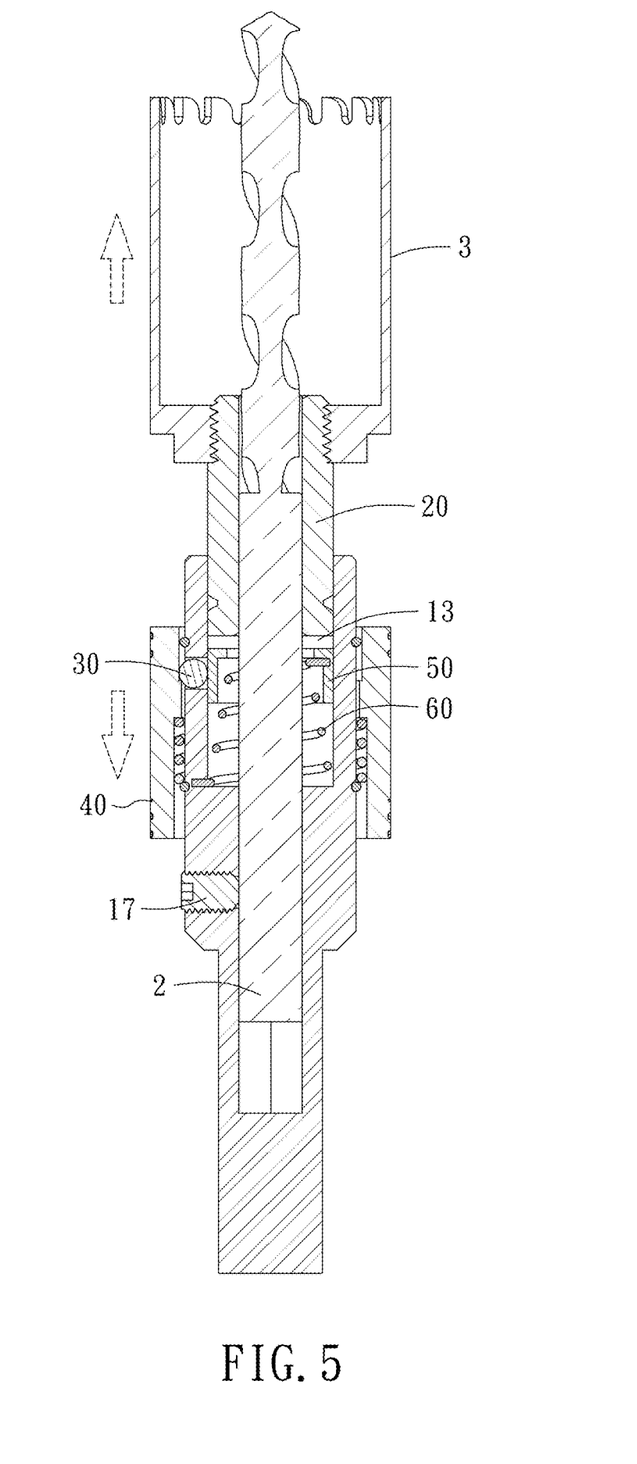
FIG. 5 is a drawing showing operation of a preferable embodiment of the present invention.

Please refer to FIGS. 1 to 5 for a preferable embodiment of the present invention. A tool connector 1 of the present invention includes a main body 10, an adapter 20, a first engaging member 30 and a sleeve 40.

The main body 10 includes a driving end portion 11 and a connecting end portion 12 opposite to each other in an axial direction A, and the driving end portion 11 is configured to be connected with a driving tool (e.g., a pneumatic tool, an electric tool, or a manual tool). The main body 10 has a first receiving hole 13 extending from the connecting end portion 12 toward the driving end portion 11 along the axial direction A and a second receiving hole 14 communicated with the first receiving hole 13, and a diametrical dimension of the first receiving hole 13 is larger than a diametrical dimension of the second receiving hole 14. A side of the main body 10 close to the connecting end portion 12 has a first radial hole 15 extending in a direction lateral to the axial direction A and communicated with the first receiving hole 13. The adapter 20 is non-rotatably disposed within the first receiving hole 13 and includes a through hole 21 configured for a tool head 2 to be disposed therethrough, and the tool head 2 may be a drill bit, a screwdriver bit, or a socket. The first engaging member 30 is movably received within the first radial hole 15. The sleeve 40 is sleeved to the main body 10 and is movable between a lock position and a release position. When the sleeve 40 is in the lock position, the sleeve 40 urges the first engaging member 30 to radially protrude into the first receiving hole 13 and be engaged with the adapter 20 in the axial direction A. When the sleeve 40 is in the release position, the first engaging member 30 is radially retractable and the adapter 20 is detachable from the first receiving hole 13, allowing the adapter 20 to be quickly installed and removed.

The first receiving hole 13 has a first cross-sectional profile being non-circular, the second receiving hole 14 has a second cross-sectional profile being non-circular, and the through hole 21 has a third cross-sectional profile being non-circular. The second cross-sectional profile and the third cross-sectional profile are identical in shape and are coaxially arranged. As viewed in the axial direction A, at least one geometric feature of the second cross-sectional profile corresponds to at least one geometric feature of the third cross-sectional profile, such as edge-to-edge, corner-to-corner, arc-to-arc, or major-axis-to-major-axis alignment. These geometric features serve to align the second cross-sectional profile with the third cross-sectional profile, thereby allowing the tool head 2 to be smoothly inserted into the second receiving hole 14 through the through hole 21 along the axial direction A. Preferably, the second cross-sectional profile and the third cross-sectional profile are polygonal. As viewed in the axial direction A, edges of the second cross-sectional profile correspond to edges of the third cross-sectional profile, wherein the correspondence may include the edges being parallel to each other or overlapping, such that the tool head 2 can be abutted against the adapter 20 and the main body 10 in a surface-contact manner, thereby effectively preventing relative rotation and achieving good assembly stability and torque transmission performance.

An outer profile of the adapter 20 is identical in shape to the first cross-sectional profile, and the first cross-sectional profile and the third cross-sectional profile are identical in shape and are coaxially arranged. As viewed in the axial direction A, at least one geometric feature of the first cross-sectional profile corresponds to the at least one geometric feature of the third cross-sectional profile. Therefore, when the adapter 20 is inserted into the first receiving hole 13, the second and the third cross-sectional profiles are correspondingly aligned to each other to facilitate assembly. In this embodiment, the first cross-sectional profile, the second cross-sectional profile and the third cross-sectional profile are respectively regular hexagonal. As viewed in the axial direction, the edges of the second cross-sectional profile and the edges of the third cross-sectional profile are substantially overlapped with each other and are respectively oriented in parallel to edges of the first cross-sectional profile. Therefore, any two among the tool head 2, the main body 10 and the adapter 20 are connected to each other in a manner of surface-to-surface contact, thereby preventing relative rotation and achieving improved assembly stability and torque transmission performance. In other embodiments, the first cross-sectional profile, the second cross-sectional profile and the third cross-sectional profile may alternatively be octagonal, elliptical, arc-shaped, or of other shapes.

In this embodiment, the adapter 20 includes a threaded segment 22 configured to be screwed with a hole saw 3 and an insertion segment 23 disposed into the first receiving hole 13, and the insertion segment 23 has an outer profile being hexagonal and has an engaging groove 231 for the first engaging member 30 to be engaged therewithin. The insertion segment 23 partially protrudes beyond the first receiving hole 13, and when the sleeve 40 is in the lock position, the sleeve 40 is spaced apart from an end surface of the connecting end portion 12 by a gap G in the axial direction A, thereby reducing the likelihood of inadvertent contact with the sleeve 40 during operation, enhancing operational safety, and minimizing contact and friction between the hole saw 3 and the sleeve 40 or the main body 10, thereby avoiding wear of the components.

In the axial direction A, an extending length of the first receiving hole 13 is shorter than or equal to an extending length of the second receiving hole 14 so as to increase the contact area between the tool head 2 and the main body 10 and facilitate torque transmission. The main body 10 further has a second radial hole 16 and a second engaging member 17 (such as a set screw) disposed through the second radial hole 16, and the second radial hole 16 extends in the direction lateral to the axial direction and is communicated with the second receiving hole 14. When the tool head 2 is disposed into the second receiving hole 14 through the through hole 21, the second engaging member 17 is configured to be radially abutted against the tool head 2, thereby ensuring that the tool head 2 is stably connected to the main body 10, and reducing looseness, deflection, or poor torque transmission caused by assembly tolerances between components. Accordingly, the tool head 2 and the adapter 20 are coupled to the main body 10 via different mechanisms, thereby allowing the tool head 2 or the hole saw 3 to be independently replaced.

The tool connector 1 further includes a pushing member 50 and a first elastic member 60 which are located between the main body 10 and the adapter 20. An outer profile of the pushing member 50 is non-circular, and the pushing member 50 is received in the first receiving hole 13 and is movable relative to the main body 10 in the axial direction A. The first elastic member 60 is elastically abutted against and between the pushing member 50 and the main body 10 so that the pushing member 50 has a tendency to move toward the adapter 20. Accordingly, when the sleeve 40 is moved to the release position, the first engaging member 30 can retract radially, and the adapter 20 is automatically ejected from the main body 10 by the elastic force of the first elastic member 60, thereby facilitating quick replacement of the adapter 20 and the hole saw 3. Preferably, a stepped surface 18 is arranged between the first receiving hole 13 and the second receiving hole 14, and the first elastic member 60 is abutted against the stepped surface 18 and is a compression spring. In the axial direction A, a free length of the first elastic member 60 is longer than or equal to ½ of the extending length of the first receiving hole 13 so as to push the adapter 20 outwardly. In this embodiment, the pushing member 50 includes an abutting wall 51 and a periphery wall 52 surrounding the abutting wall 51, and the abutting wall 51 has an opening 53 configured for the tool head 2 to be disposed therethrough. A diametrical dimension of the opening 53 is larger than a diametrical dimension of the through hole 21, and an outer profile of the periphery wall 52 is regular hexagonal and corresponds to the first receiving hole 13, thereby reducing frictional resistance and ensuring smooth movement, such that the elastic force of the first elastic member 60 is more stably applied to the adapter 20. Specifically, the first elastic member 60 may be a conical compression spring, one end of the first elastic member 60 is mounted to the pushing member 50, and the other end of the first elastic member 60 is mounted to the main body 10 near the stepped surface 18, which is easy to assembly and provides good pushing effect.

The tool connector 1 further includes a second elastic member 70, a first restricting member 80 and a second restricting member 90 which are sleeved to an outer periphery of the main body 10. The first restricting member 80 is located at a side of the sleeve 40 close to the connecting end portion 12 and is blockable with the sleeve 40 in the axial direction A. The second elastic member 70 is elastically abutted against and between the sleeve 40 and the second restricting member 90 so that the sleeve 40 has a tendency to move toward the lock position, thereby enabling automatic return of the sleeve 40 to the lock position.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool connector, comprising:
  a main body, including a driving end and a connecting end which are disposed opposite to one another in an axial direction of the tool connector, the driving end configured to be connected with a driving tool, the main body having a first receiving hole extending lengthwise from the connecting end toward the driving end in the axial direction and a second receiving hole communicated with the first receiving hole, a diametrical dimension of the first receiving hole being larger than a diametrical dimension of the second receiving hole, the second receiving hole extending lengthwise in the axial direction, and a side of the main body adjacent the connecting end having a first radial hole extending in a direction lateral to the axial direction and communicated with the first receiving hole;
  an adapter, non-rotatably disposed within the first receiving hole, the adapter including a through hole configured for a tool bit to be disposed therethrough, and the adapter further configured to have a hole saw mounted thereon;
  a first engager, movably received within the first radial hole;
  a pushing member;
  a first elastic member; and
  a sleeve, sleeved to the main body and being movable between a lock position and a release position; wherein when the sleeve is in the lock position, the sleeve urges the first engager to radially protrude into the first receiving hole and be engaged with the adapter; and when the sleeve is in the release position, the first engager is radially retracted and the adapter is detachable from the first receiving hole;
  wherein the first receiving hole has a first cross-sectional profile that is non-circular, the second receiving hole has a second cross-sectional profile that is non-circular, and the through hole has a third cross-sectional profile that is non-circular, the second cross-sectional profile and the third cross-sectional profile are identical in shape and are coaxially arranged, and as viewed in the axial direction, at least one geometric feature of the second cross-sectional profile corresponds to at least one geometric feature of the third cross-sectional profile,
  wherein the pushing member and the first elastic member are located between the main body and the adapter with respect to the axial direction, and
  wherein an outer profile of the pushing member is non-circular, the pushing member is received in the first receiving hole and is movable relative to the main body in the axial direction, and wherein the first elastic member is elastically abutted against and between the pushing member and the main body so that the pushing member is biased toward the adapter.

2. The tool connector of claim 1, wherein
  the second cross-sectional profile and the third cross-sectional profile are each polygonal in shape, and
  as viewed in the axial direction, edges of the second cross-sectional profile correspond to edges of the third cross-sectional profile.

3. The tool connector of claim 2, wherein the first cross-sectional profile, the second cross-sectional profile and the third cross-sectional profile are respectively regular hexagonal in shape.

4. The tool connector of claim 1, wherein
  an outer profile of the adapter is identical in shape to the first cross-sectional profile,
  the first cross-sectional profile and the third cross-sectional profile are identical in shape and are coaxially arranged, and
  as viewed in the axial direction, at least one geometric feature of the first cross-sectional profile corresponds to the at least one geometric feature of the third cross-sectional profile.

5. The tool connector of claim 1, wherein in the axial direction, an extending length of the first receiving hole is shorter than or equal to an extending length of the second receiving hole.

6. The tool connector of claim 1, wherein
  the adapter includes a threaded segment configured to be screwed with the hole saw and further includes an insertion segment disposed into the first receiving hole, the insertion segment partially protruding beyond the first receiving hole, and
  when the sleeve is in the lock position, the sleeve is spaced apart from an end surface of the connecting end by a gap in the axial direction.

7. The tool connector of claim 1, wherein
  the main body further has a second radial hole and a second engager disposed through the second radial hole, the second radial hole extends in the direction lateral to the axial direction and is communicated with the second receiving hole, and
  when the tool bit is disposed into the second receiving hole through the through hole, the second engager is configured to be radially abutted against the tool bit.

8. The tool connector of claim 1, wherein
  a stepped surface is arranged between the first receiving hole and the second receiving hole, the first elastic member is a compression spring and is abutted against the stepped surface, and
  in the axial direction, a free length of the first elastic member is longer than or equal to ½ of an extending length of the first receiving hole.

9. The tool connector of claim 8, wherein
  the first cross-sectional profile, the second cross-sectional profile and the third cross-sectional profile are respectively regular hexagonal in shape;
  as viewed in the axial direction, edges of the second cross-sectional profile and edges of the third cross-sectional profile are overlapped with each other and are respectively oriented in parallel to edges of the first cross-sectional profile;
  in the axial direction, an extending length of the first receiving hole is shorter than or equal to an extending length of the second receiving hole;
  the adapter includes a threaded segment configured to be screwed with the hole saw and further includes an insertion segment disposed into the first receiving hole, the insertion segment partially protrudes beyond the first receiving hole, and when the sleeve is in the lock position, the sleeve is spaced apart from an end surface of the connecting end by a gap in the axial direction;

the main body further has a second radial hole and a second engager disposed through the second radial hole, the second radial hole extends in the direction lateral to the axial direction and is communicated with the second receiving hole, and when the tool bit is disposed into the second receiving hole through the through hole, the second engager is configured to be radially abutted against the tool bit;

the pushing member includes an abutting wall and a periphery wall surrounding the abutting wall, the abutting wall has an opening configured for the tool bit to be disposed therethrough, a diametrical dimension of the opening is larger than a diametrical dimension of the through hole, and an outer profile of the periphery wall is regular hexagonal in shape and corresponds to the first cross-sectional profile;

the first elastic member is a conical compression spring, one end of the first elastic member is mounted to the pushing member, and an opposing end of the first elastic member is mounted to the main body adjacent the stepped surface; and the tool connector further includes a second elastic member, a first restricting member and a second restricting member which are sleeved to an outer periphery of the main body, the first restricting member is located at a side of the sleeve adjacent the connecting end and is blockable with the sleeve in the axial direction, and the second elastic member is elastically abutted against and between the sleeve and the second restricting member so that the sleeve is biased toward the lock position.

\* \* \* \* \*